United States Patent
Iwasaki

(10) Patent No.: US 9,077,979 B2
(45) Date of Patent: Jul. 7, 2015

(54) STEREOSCOPIC IMAGE CAPTURE DEVICE AND METHOD

(71) Applicant: FUJIFILM Corporation, Tokyo (JP)

(72) Inventor: Yoichi Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/193,207

(22) Filed: Feb. 28, 2014

(65) Prior Publication Data

US 2014/0176682 A1    Jun. 26, 2014

Related U.S. Application Data

(63) Continuation of application No. PCT/JP2012/067548, filed on Jul. 10, 2012.

(30) Foreign Application Priority Data

Sep. 9, 2011    (JP) .................................. 2011-197496

(51) Int. Cl.
*H04N 13/02* (2006.01)
*G02B 7/28* (2006.01)
(Continued)

(52) U.S. Cl.
CPC .............. *H04N 13/0235* (2013.01); *G02B 7/28* (2013.01); *G02B 7/34* (2013.01); *G02B 7/36* (2013.01);
(Continued)

(58) Field of Classification Search
CPC .... G02B 27/14; G02B 27/64; G02B 27/2242; H04N 13/00
See application file for complete search history.

(56) References Cited

U.S. PATENT DOCUMENTS 2,854,885 A * 10/1958 Robinson et al. .............. 352/131
4,124,291 A * 11/1978 Lo et al. .......................... 355/22
(Continued)

FOREIGN PATENT DOCUMENTS

JP    2006-78638 A    3/2006
JP    2008-242182 A    10/2008
(Continued)

OTHER PUBLICATIONS

International Search Report, mailed Oct. 16, 2012, issued in PCT/JP2012/067548.
(Continued)

*Primary Examiner* — Sath V Perungavoor
*Assistant Examiner* — Matthew J Anderson
(74) *Attorney, Agent, or Firm* — Birch, Stewart, Kolasch & Birch, LLP

(57) ABSTRACT

A stereoscopic image capture device comprising: a single imaging optical system; an imaging element that forms pupil-divided object images; a diaphragm that restricts a light flux that enters into the imaging element; and a diaphragm control device, wherein, when focal lengths before and after adjusting the focal length of the imaging optical system are assumed to be f1 and f2 and the F value of the diaphragm before adjusting the focal length of the imaging optical system is assumed to be FNo1, the diaphragm control device performs control such that an F value of FNo2 after adjusting the focal length of the imaging optical system becomes an F value that can be set according to a following equation:

$$FNo2 = FNo1 * \left(\frac{f2}{f1}\right)^2.$$

16 Claims, 9 Drawing Sheets

(51) Int. Cl.
*G02B 7/34* (2006.01)
*G02B 7/36* (2006.01)
*G03B 35/08* (2006.01)
*H04N 5/238* (2006.01)
*H04N 5/232* (2006.01)
*G03B 35/06* (2006.01)

(52) U.S. Cl.
CPC ............... *G03B 35/08* (2013.01); *H04N 5/238* (2013.01); *H04N 5/23212* (2013.01); *H04N 13/0217* (2013.01); *G03B 35/06* (2013.01); *H04N 13/0257* (2013.01); *H04N 13/0232* (2013.01)

(56) References Cited

U.S. PATENT DOCUMENTS

| | | | |
|---|---|---|---|
| 5,311,240 A * | 5/1994 | Wheeler | 396/60 |
| 6,111,597 A * | 8/2000 | Tabata | 348/43 |
| 6,262,743 B1 * | 7/2001 | Allio | 345/427 |
| 6,512,892 B1 * | 1/2003 | Montgomery et al. | 396/326 |
| 6,864,911 B1 * | 3/2005 | Zhang et al. | 348/42 |
| 8,717,485 B2 * | 5/2014 | Oberdoerster et al. | 348/340 |
| 8,743,185 B2 * | 6/2014 | Yamaguchi et al. | 348/49 |
| 8,842,164 B2 * | 9/2014 | Kuroki | 348/46 |
| 8,878,907 B2 * | 11/2014 | Awazu et al. | 348/46 |
| 2001/0048474 A1 | 12/2001 | Yamazaki et al. | |
| 2002/0118450 A1 * | 8/2002 | Ito et al. | 359/385 |
| 2008/0158346 A1 * | 7/2008 | Okamoto et al. | 348/47 |
| 2008/0240701 A1 * | 10/2008 | Kusaka | 396/104 |
| 2010/0171815 A1 * | 7/2010 | Park et al. | 348/47 |
| 2010/0239240 A1 * | 9/2010 | Cameron et al. | 396/325 |
| 2010/0245546 A1 | 9/2010 | Kuroki | |
| 2011/0050857 A1 * | 3/2011 | Lee et al. | 348/47 |
| 2011/0181593 A1 * | 7/2011 | Hirai et al. | 345/427 |
| 2011/0187834 A1 * | 8/2011 | Morifuji et al. | 348/47 |
| 2012/0007954 A1 * | 1/2012 | Miller et al. | 348/46 |
| 2012/0051665 A1 * | 3/2012 | Adams et al. | 382/294 |

FOREIGN PATENT DOCUMENTS

| | | | |
|---|---|---|---|
| JP | 2009-25835 A | | 2/2009 |
| JP | 2009-168995 A | | 7/2009 |
| JP | 2009168995 A | * | 7/2009 |
| JP | 2010-81580 A | | 4/2010 |
| JP | 2010-213083 A | | 9/2010 |

OTHER PUBLICATIONS

Written Opinion of the International Searching Authority, mailed Oct. 16, 2012, issued in PCT/JP2012/067548.
Japanese Office Action dated Apr. 21, 2014, issued in corresponding Japanese Patent Application No. 2013-532488.
Extended European Search Report for European Application No. 12830075.3, dated May 4, 2015.

* cited by examiner

STEREOSCOPIC IMAGE CAPTURE DEVICE AND METHOD

CROSS REFERENCE TO RELATED APPLICATIONS

This application is a Continuation of PCT International Application No. PCT/JP2012/067548 filed on Jul. 10, 2012, which claims priority under 35 U.S.C. §119(a) to Patent Application No. 2011-197496 filed in Japan on Sep. 9, 2011, all of which are hereby expressly incorporated by reference into the present application.

BACKGROUND OF THE INVENTION

1. Field of the Invention

The present invention relates to a stereoscopic image capture device, and specifically relates to a technique of forming object images passing through different regions of an imaging optical system on respective imaging elements and acquiring a stereoscopic image formed with a plurality of parallax images.

2. Description of the Related Art

Japanese Patent Application Laid-Open No. 2009-168995 (hereinafter referred to as PTL 1) discloses a ranging device that calculates a defocus amount by arranging two polarization elements with mutually orthogonal polarizing axes in the pupil position of a monocular optical system, separating light fluxes passing through these polarization elements by a beam splitter, entering them into two imaging elements, taking two images and comparing the phase difference of an object in two images in the same way as phase difference AF.

Also, PTL 1 contains description that stereoscopic image capture is possible by taking two images, especially, contains description that it is possible to adjust the stereoscopic effect of a stereoscopic image taken in a monocular optical system by changing the F value of a pupil mask (paragraph [0047] of PTL 1).

Further, PTL 1 describes three kinds of pupil masks selected by the F value of the optical system, where each pupil mask has a pair of openings with mutually different distances from the light axis of the optical system. Subsequently, in a case where the F value is small (bright), the ranging accuracy is maintained by using a pupil mask having the most remote pupil region from the light axis, and, since a light flux from the periphery is restricted as the F value becomes large (dark), a pupil mask with a pair of openings close to the light axis of the optical system is selected. Moreover, these pupil masks are selected according to the open F value, and, in a case where the F value varies by focal length, appropriate focus detection is always enabled by switching it according to the focal distance.

Japanese Patent Application Laid-Open No. 2008-242182 (hereinafter referred to as PTL 2) describes a focus point detection device that performs focus point detection in a pupil-division-type phase difference detection system. In this focus detection device, the maximum image surface defocus amount of an interchangeable lens is substantially proportional to the focal length. Therefore, in a case where the focal length is equal to or greater than a predetermined value, the diaphragm is set to the F value darker than the open F value to perform focus point detection, and, in the following case, the diaphragm is set to the F value darker than the open F value to prohibit execution of the focus point detection or the diaphragm is set to the F value darker than the open F value to adjust the F value in the case of performing the focus point detection according to the focal length (paragraph [0053] of PTL 2).

SUMMARY OF THE INVENTION

In the case of changing the focal length of an imaging optical system and adjusting an angle of view in a monocular stereoscopic image capture device, there is a problem that the parallax (stereoscopic effect) of right and left parallax images varies according to the change in the focal length and a feeling of strangeness is caused at the time of adjusting the angle of view, and, furthermore, there is a problem that the user cannot take a parallax image having a user's desired stereoscopic effect.

Although PTL 1 contains description that the stereoscopic effect is adjusted by changing the F value of a pupil mask, it does not contain description related to specific stereoscopic effect adjustment. Here, although an arbitrary pupil mask is selected from three kinds of pupil masks in PTL 1, this pupil mask selection is performed to enable optimal focus point detection and not to adjust the stereoscopic effect.

Moreover, although the F value of the diaphragm is adjusted to perform adequate focus point detection in the invention described in PTL 2, the imaging device described in PTL 2 does not take a stereoscopic image primarily.

The present invention is made taking into account such a condition, and it is an object to provide a stereoscopic image capture device and method that can prevent the stereoscopic effect of a parallax image for stereoscopic vision from being changed when the focal length of an imaging optical system is changed.

To achieve this object, a stereoscopic image capture device according to one aspect of the present invention includes: a single imaging optical system that can adjust a focal length; an imaging element that forms pupil-divided object images passing through different regions of the imaging optical system, photoelectrically converts the object images passing through the different regions and outputs a plurality of parallax images with different parallaxes; a diaphragm that restricts a light flux that enters into the imaging element; and a diaphragm control device for controlling an F value of the diaphragm based on a focal length of the imaging optical system before and after adjusting the focal length of the imaging optical system, in which, when focal lengths before and after adjusting the focal length of the imaging optical system are assumed to be f1 and f2 and the F value of the diaphragm before adjusting the focal length of the imaging optical system is assumed to be FNo1, the diaphragm control device performs control such that an F value of FNo2 after adjusting the focal length of the imaging optical system becomes an F value that can be set according to a following equation:

$$FNo2 = FNo1 * \left(\frac{f2}{f1}\right)^2. \qquad \text{[Equation 1]}$$

According to one aspect of the present invention, in the stereoscopic image capture device having the single imaging optical system, the diaphragm is controlled so as to become an F value that can be set and that is close to an F value of FNo2 of the diaphragm calculated from Equation 1 on the basis of focal length f1 and f2 before and after adjusting the focal length of the imaging optical system. Above-mentioned Equation 1 denotes a conditional equation to calculate the F value (FNo2) that does not change the stereoscopic effect of parallax images for stereoscopic vision in a case where the focal length of the imaging optical system changes from f1 to f2. In a case where the focal length of the imaging optical system is changed and the angle of view is adjusted by controlling the F value of the diaphragm according to above-mentioned Equation 1, the stereoscopic effect of stereoscopic images is not changed and a feeling of strangeness is not caused. Moreover, regardless of the focal length of the imaging optical system, it is possible to take a parallax image with a user's desired stereoscopic effect.

The stereoscopic image capture device according to another aspect of the present invention includes: a focal length detection device for detecting the focal length of the imaging optical system or a focal length setting device for setting the focal length of the imaging optical system by manual operation, in which the diaphragm control device acquires the focal length detected by the focal length detection device or the focal length set by the focal length setting device.

In the stereoscopic image capture device according to another aspect of the present invention, in which it is preferable that the diaphragm control device continuously acquires the focal length f2 including a focal length during adjustment of the focal length of the imaging optical system at predetermined time intervals and continuously controls the F value of the diaphragm based on the focal length f1 before adjusting the focal length of the imaging optical system and the focal length f2 continuously acquired at the predetermined time intervals. According to this, it is possible to cause the stereoscopic effect of a parallax image not to be changed while the focal length of the imaging optical system is changed at the time of recording a moving image or the like.

The stereoscopic image capture device according to another aspect of the present invention further includes: a stereoscopic display device; and a display control device for displaying a stereoscopic image on the stereoscopic display device based on the plurality of parallax images output from the imaging element.

The stereoscopic image capture device according to another aspect of the present invention includes: a brightness detection device for detecting object brightness; and an exposure condition decision device for deciding an exposure condition based on the object brightness detected by the brightness detection device, in which the exposure condition decision device decides other exposure conditions than the diaphragm based on the F value of the diaphragm controlled by the diaphragm control device. By this means, even if the F value of the diaphragm is controlled according to the change in the focal length of the imaging optical system, it is possible to cause the brightness of parallax images taken before and after the change in the focal length not to be changed.

The stereoscopic image capture device according to another aspect of the present invention includes: a brightness detection device for detecting object brightness; and an initial F value setting device for setting an initial F value of the diaphragm based on the object brightness detected by the brightness detection device, in which the F value of the diaphragm before adjusting the focal length of the imaging optical system is the F value set by the initial F value setting device.

In the stereoscopic image capture device according to another aspect of the present invention, the initial F value setting device sets the initial F value of the diaphragm based on the object brightness detected by the brightness detection device when a certain period of time passes after a power source is turned on.

In the stereoscopic image capture device according to another aspect of the present invention, the initial F value setting device sets the initial F value of the diaphragm based on the object brightness detected by the brightness detection device when the focal length of the imaging optical system is initially changed after a power source is turned on.

In the stereoscopic image capture device according to another aspect of the present invention, the initial F value setting device sets the initial F value of the diaphragm based on the object brightness detected by the brightness detection device when a recording start in a moving image imaging mode to take a moving image is instructed.

The stereoscopic image capture device according to another aspect of the present invention includes: a stereoscopic effect designation device for designating a level of a stereoscopic effect of the plurality of parallax images output from the imaging element; and an initial F value setting device for setting the initial F value of the diaphragm based on the stereoscopic effect designated by the stereoscopic effect designation device, in which the F value of the diaphragm before adjusting the focal length of the imaging optical system is the F value set by the initial F value setting device. By this means, it is possible to cause the stereoscopic effect not to be changed even if the F value by which it is possible to acquire the stereoscopic effect designated by the stereoscopic effect designation device is initially set and thereafter the focal length is changed.

The stereoscopic image capture device according to another aspect of the present invention includes: a ranging device for measuring an object distance; and a focal length detection device for detecting the focal length of the imaging optical system, in which the initial F value setting device sets the initial F value of the diaphragm based on the stereoscopic effect set by the stereoscopic effect designation device, the focal length detection device detected by the focal length detection device and the object distance measured by the ranging device. Since the stereoscopic effect of a parallax image for stereoscopic vision is changed by the focal length of the imaging optical system and the object distance, the initial F value of the diaphragm is set on the basis of the focal length and the object distance of the imaging optical system so as to be able to acquire the stereoscopic effect designated by the stereoscopic effect designation device.

In the stereoscopic image capture device according to another aspect of the present invention, when controlling the F value of the diaphragm based on the focal length of the imaging optical system, in a case where a limit F value of the diaphragm is exceeded, the diaphragm control device fixes the limit F value. After the diaphragm reaches the limit F value, when the focal length of the imaging optical system is further changed, since it is not possible to adjust the stereoscopic effect by the diaphragm, the stereoscopic effect is changed.

In the stereoscopic image capture device according to another aspect of the present invention, when controlling the F value of the diaphragm based on the focal length of the imaging optical system, in a case where a limit F value of the diaphragm is exceeded, the diaphragm control device fixes the limit F value and restricts a change in the focal length of the imaging optical system in a direction to exceed the limit F value of the diaphragm. By this means, although the focal length of the imaging optical system is restricted, it is possible to maintain the stereoscopic effect of a parallax image for stereoscopic vision.

In the stereoscopic image capture device according to another aspect of the present invention, it is preferable to further include: an imaging scene detection device for detecting a change in an imaging scene; and a release device for releasing control of the F value of the diaphragm based on the focal length of the imaging optical system by the diaphragm control device when the imaging scene detection device detects that the imaging scene is changed. Normally, although the adjustment of the angle of view is performed such that the object becomes a desired size after the object (target) is decided, in a case where the imaging scene is changed, it is considered that the object is changed and the adjustment of the angle of view is stopped. Therefore, in a case where the imaging scene is changed, control of the F value of the diaphragm to maintain the stereoscopic effect of the object is released. Here, the initial F value is set again under a predetermined condition, and the control of the F value of the diaphragm to maintain the stereoscopic effect of the object is restarted.

In the stereoscopic image capture device according to another aspect of the present invention, the imaging element includes a first group pixel and a second group pixel for photoelectric conversion that are arranged in a matrix manner in an exposure region of the imaging element, the first group pixel is restricted in a light receiving direction of a light flux so as to receive light of only an object image passing through a first region of the imaging optical system, the second group pixel is restricted in the light receiving direction of the light flux so as to receive light of only an object passing through a second region of the imaging optical system, and the plurality of parallax images can be read out from the first group pixel and the second group pixel. By this means, it is possible to acquire a plurality of parallax images at the same time in one imaging element and the device does not grow in size.

Moreover, the present invention provides a stereoscopic image capture method in a stereoscopic image capture device including: a single imaging optical system that can adjust a focal length; an imaging element that forms pupil-divided object images passing through different regions of the imaging optical system, photoelectrically converts the object images passing through the different regions and outputs a plurality of parallax images with different parallaxes; a diaphragm that restricts a light flux that enters into the imaging element; and a diaphragm control device for controlling an F value of the diaphragm based on a focal length of the imaging optical system before and after adjusting the focal length of the imaging optical system, in which, when focal lengths before and after adjusting the focal length of the imaging optical system are assumed to be f1 and f2 and the F value of the diaphragm before adjusting the focal length of the imaging optical system is assumed to be FNo1, the diaphragm control device performs control such that an F value of FNo2 after adjusting the focal length of the imaging optical system becomes an F value that can be set according to above-mentioned Equation 1.

According to the present invention, in a monocular stereoscopic image capture device, by controlling the F value of a diaphragm on the basis of the focal length of an imaging optical system, it is possible to prevent the stereoscopic effect of a parallax image for stereoscopic vision from being changed when the focal length of the imaging optical system is changed. By this means, in the case of changing the focal length of the imaging optical system and adjusting an angle of view, it is possible to prevent a feeling of strangeness from being caused at the time of adjusting the angle of view without changing the stereoscopic effect of a stereoscopic image, and it is possible to take a parallax image having a user's desired stereoscopic effect.

DETAILED DESCRIPTION OF EXEMPLARY EMBODIMENTS

In the following, embodiments of a stereoscopic image capture device according to the present invention are described according to the accompanying drawings.

First Embodiment

Overall Configuration of Stereoscopic Image Capture Device

Figure 1:
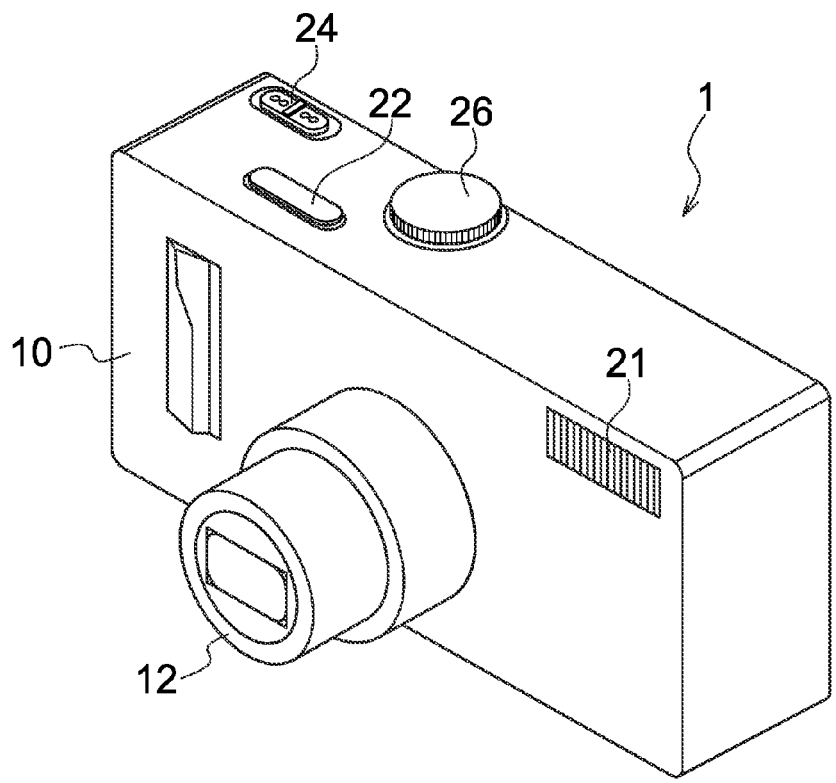
FIG. 1 is a perspective view illustrating an embodiment of a stereoscopic image capture device according to the present invention.
Figure 2:
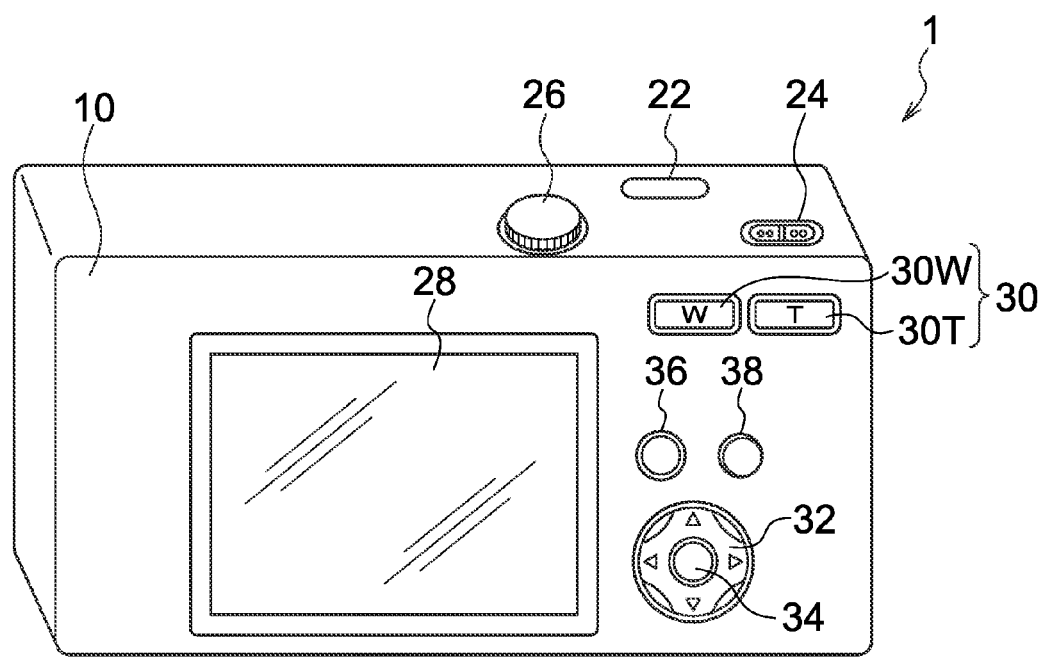
FIG. 2 is a back view of the above-mentioned stereoscopic image capture device.

FIG. 1 is a perspective view illustrating an embodiment of a stereoscopic image capture device according to the present invention. FIG. 2 is a back view of the above-mentioned stereoscopic image capture device. This stereoscopic image capture device 1 denotes a digital camera that receives light passing through a lens by an imaging element, converts it into a digital signal and records it in recording media.

A camera body 10 of a stereoscopic image capture device 1 is formed in a horizontally-long square box shape, and a lens unit 12 and a strobe 21 or the like are arranged in the front surface as illustrated in FIG. 1. Moreover, a shutter button 22 and a power/mode switch 24 and a mode dial 26 or the like are arranged on the upper surface of the camera body 10. Meanwhile, as illustrated in FIG. 2, a 3D image display device 28, a zoom button 30, a cross button 32, a MENU/OK button 34, a playback button 36 and a BACK button 38 or the like are arranged on the back of the camera body 10.

Here, a tripod screw hole and a battery insertion portion and memory card slot through an openable/closable cover are installed on the lower surface of the camera body 10 which is not illustrated, and the battery and the memory card are loaded into these battery insertion portion and the memory card slot.

The lens unit 12 includes a collapsible zoom lens and is run out from the camera body 10 by setting the camera mode to an imaging mode by the power/mode switch 24. Here, since the zoom mechanism and the collapsing mechanism of the lens unit 12 are known techniques, explanation of their specific configurations is omitted.

The strobe 21 irradiates strobe light to a main object.

The shutter button 22 is formed with two-stage stroke-type switches including so-called "half press" and "full press". If the stereoscopic image capture device 1 is drive in an imaging mode, AE/AF operates when this shutter button 22 is "pressed halfway", and imaging is performed by the "full press". Moreover, if the stereoscopic image capture device 1 is driven in the imaging mode, imaging is performed by pressing this shutter button 22 fully.

The power/mode switch 24 has a function as a power source switch that turns on/off the power source of the stereoscopic image capture device 1 and a function as a mode switch that sets the mode of the stereoscopic image capture device 1, and it is slidably arranged between the "OFF position", the "playback position" and the "imaging position". The stereoscopic image capture device 1 is turned on by sliding the power/mode switch 24 and setting it to the "playback position" or the "imaging position", and is turned off by setting it to the "OFF position". Further, the "playback mode" is set by sliding the power/mode switch 24 and setting it to the "playback mode", and the "imaging mode" is set by setting it to the "imaging mode".

The mode dial 26 functions as an imaging mode setting device for setting the imaging mode of the stereoscopic image capture device 1, and the imaging mode of the stereoscopic image capture device 1 is set to various modes by the setting position of this mode dial. For example, it is the "plane image imaging mode" to take a plane image, the "stereoscopic image imaging mode" to take a stereoscopic image (3D image) or the "moving image imaging mode" to take a moving image.

The 3D image display device 28 denotes a stereoscopic display device for being able to display stereoscopic images (left parallax image and right parallax image) as directivity images with respective predetermined directivities by a parallax barrier. In a case where the stereoscopic image is input in the 3D image display device 28, a parallax barrier of a pattern in which a light transmission portion and a light shielding portion are alternately arranged at a predetermined pitch is generated on a parallax barrier display layer of the 3D image display device 28, and strip-shaped image fragments showing right and left images are alternately arranged on the image display surface of the lower layer thereof. In a case where it is used as a display panel of plane images or user interface, nothing is displayed on the parallax barrier display layer and one image is displayed on the imaging display surface side of the lower layer thereof. Also, the mode of the 3D image display device 28 is not limited to this, the one using a lenticular lens is possible as long as it is possible to display the left parallax image and the right parallax image so as to be recognizable as a stereoscopic image, or the one is possible in which it is possible to individually see the left parallax image and the right parallax image by wearing dedicated glasses such as polarized glasses and liquid crystal shutter glasses.

The zoom button 30 functions as a zoom instruction device for instructing a zoom, and includes zoom tele button 30T that instructs a zoom on the telephoto side and zoom wide button 30W that instructs a zoom on the wide angle side. In the stereoscopic image capture device 1, at the time of the imaging mode, the focal length of the lens unit 12 is changed by operating these zoom tele button 30T and zoom wide button 30W. Moreover, at the time of the playback mode, a currently played image is rescaled by operating these zoom tele button 30T and zoom wide button 30W.

The cross button 32 denotes an operation unit that inputs an instruction of four of the upper, lower, right and left directions, and functions as a button (a cursor movement operative device) that selects an item from a menu screen and instructs selection of various setting items from each menu. The left/right key functions as a frame advance (forward/backward advance) button at the time of the playback mode.

The MENU/OK button 34 denotes an operation key having both a function as a menu button that given an instruction to display a menu on the screen of the 3D image display device 28 and a function as an OK button that instructs fixation and execution of selected content.

The playback button 36 denotes a button to switch to the playback mode that displays a still image or moving image of an imaged and recorded stereoscopic image (3D image) or plane image (2D image) on the 3D image display device 28.

The BACK button 38 functions as a button that givens an instruction to cancel an input operation or return to the previous operation state.

[Configuration Examples of Imaging Optical System and Imaging Element]

The lens unit 12 is mainly formed with an imaging lens 14, a diaphragm 16 and an imaging element 17 that is a phase difference image sensor.

The imaging lens 14 denotes an imaging optical system formed with many lenses including a focus lens and a zoom lens. For example, the diaphragm 16 is formed with five diaphragm blades, and, for example, subjected to diaphragm control in a continuous or phased manner from F1 to F16 of the diaphragm value (F value). At the time of the imaging mode, image light indicating the object is formed on the light receiving surface of the imaging element 17 through the imaging lens 14 and the diaphragm 16.

Figure 3:
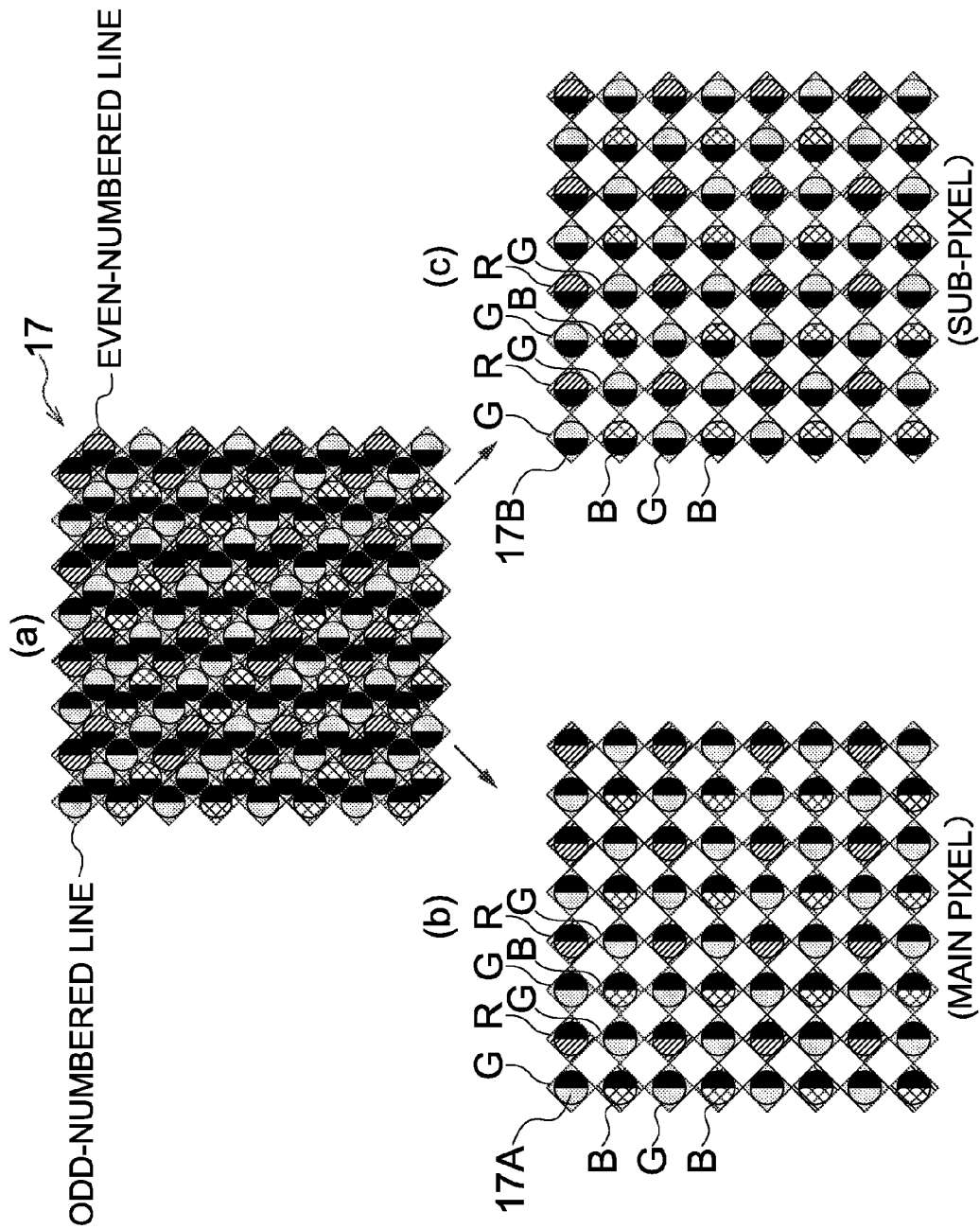
FIG. 3 is a view illustrating a configuration example of an imaging element of a stereoscopic image capture device.

FIG. 3 is a view illustrating a configuration example of the imaging element 17.

As illustrated in part (a) of FIG. 3, the imaging element 17 has pixels (main pixels which are also referred to as "A side pixels") of odd-numbered lines arranged in a matrix manner and pixels (sub-pixels which are also referred to as "B side pixels") of even-numbered lines, and image signals of two regions subjected to photoelectric conversion in these main pixels and sub-pixels can be read independently.

As illustrated in part (b) of FIG. 3, in the odd-numbered lines (1, 3, 5 . . . ) of the imaging element 17, a line of pixel array of GRGR . . . and a line of pixel array of BGBG . . . are alternately provided among pixels having color filters of R(red), G(green) and B(blue). On the other hand, as illustrated in part (c) of FIG. 3, in the even-numbered lines (2, 4, 6 . . . ), similar to the odd-numbered lines, a line of pixel array of GRGR . . . and a line of pixel array of BGBG . . . are alternately provided, and, as for the pixels of the even-numbered lines, the pixels are arranged while being mutually shifted by ½ pitches in the line direction.

Figure 4:
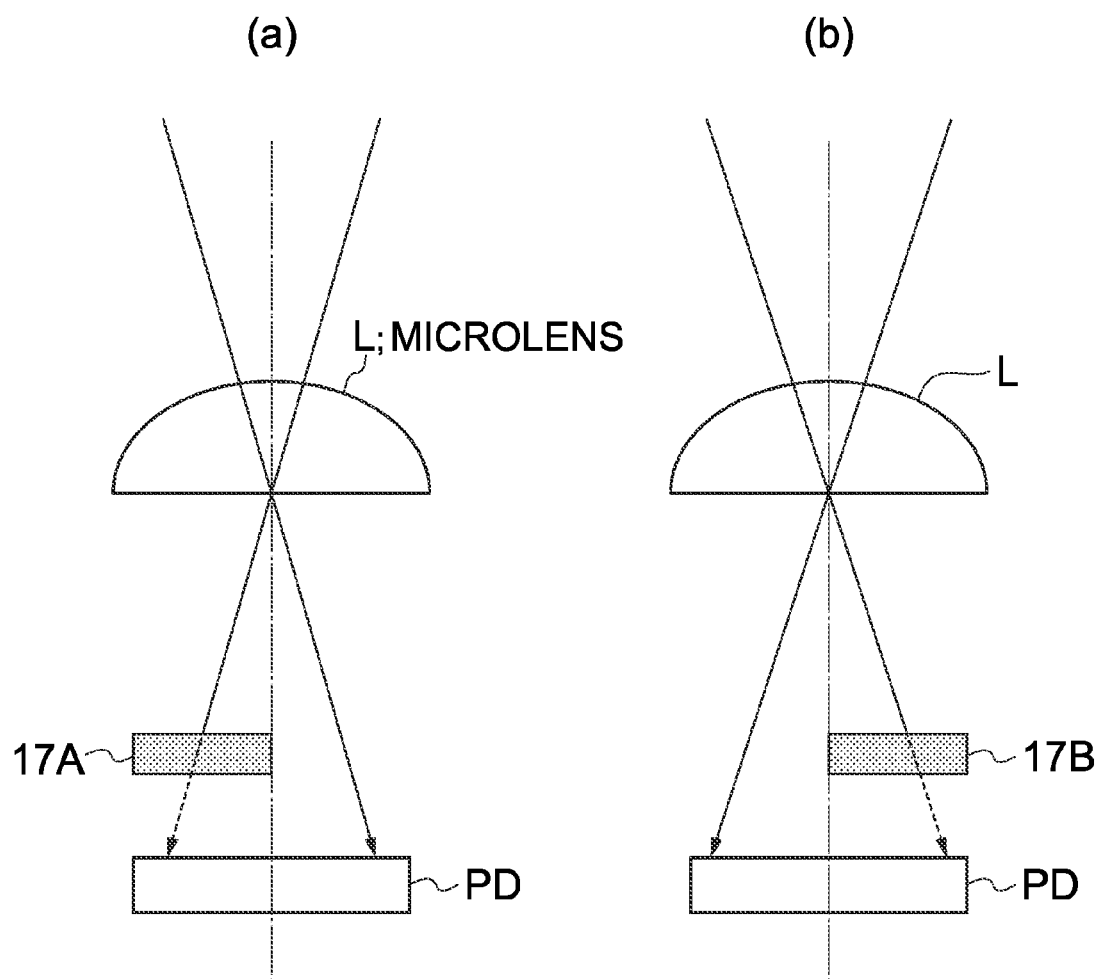
FIG. 4 is an enlarged main component view of the above-mentioned imaging element.

FIG. 4 is an enlarged main component important view of the imaging element 17 that functions as a phase difference image sensor.

A light shielding member 17A is arranged on the front surface side (microlens L side) of photodiode PD of the main pixel of the imaging element 17 as illustrated in part (a) of FIG. 4, while a light shielding member 17B is arranged on the front surface side of photodiode PD of the sub-pixel as illustrated in part (b) of FIG. 4. Microlens L and the light shielding members 17A and 17B have a function as a pupil division device, and the light shielding member 17A shields light in the left half of the light receiving surface of the main pixel (photodiode PD) as illustrated in part (a) of FIG. 4. Therefore, in the main pixel, the light is received only on the left side of the light axis of a light flux passing through the exit pupil of the imaging lens 14. Also, as illustrated in part (b) of FIG. 4, the light shielding member 17B shields light in the right half of the light receiving surface of the sub-pixel element (photodiode PD). Therefore, in the sub-pixel, the light is received only on the right side of the light axis of a light flux passing through the exit pupil of the imaging lens 14. Thus, a light flux passing through the exit pupil is horizontally divided by microlens L and the light shielding members 17A and 17B that are a pupil division device, and entered into the main pixel and the sub-pixel.

Moreover, in an object image corresponding to the left-half light flux and an object image corresponding to the right-half flux in the light flux passing through the exit pupil of the imaging lens 14, although a focused part is formed on the same position as the one on the imaging element 17, a front-focused or rear-focused part enters into a different position on the imaging element 17 (the phase shifts). By this means, the object image corresponding to the left-half light flux and the object image corresponding to the right-half light flux can be acquired as parallax images (left parallax image and right parallax image) with different parallaxes.

[Internal Configuration of Imaging Device]

Figure 5:
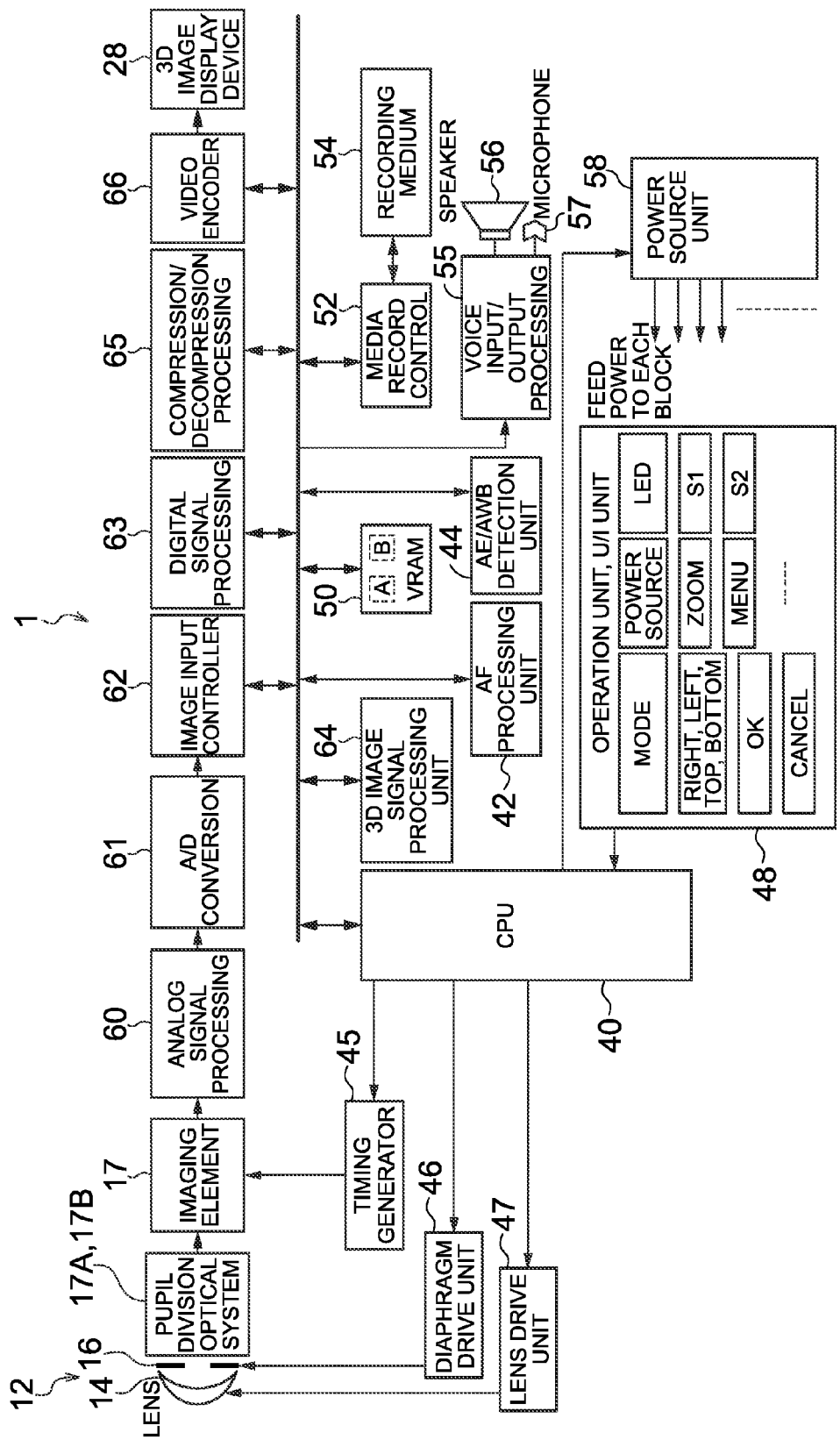
FIG. 5 is a block diagram illustrating an embodiment of the above-mentioned stereoscopic image capture device.

FIG. 5 is a block diagram illustrating an embodiment of the stereoscopic image capture device 1 according to the present invention. This stereoscopic image capture device 1 records a taken image in a recording medium 54, and the operation of the entire device is integrally controlled by a central processing unit (CPU) 40.

The stereoscopic image capture device 1 includes am operation unit 48 such as a shutter button, a mode dial, a playback button, a MENU/OK key, a cross key a zoom button and a BACK key. A signal from this operation unit 48 is input in the CPU 40, and the CPU 40 controls each circuit of the stereoscopic image capture device 1 on the basis of the input signal, for example, performs lens drive control, diaphragm drive control, imaging operation control, image processing control, recording/reoccurrence control of image data or display control of the 3D image display device 28, and so on.

When the stereoscopic image capture device 1 is powered on by the power/mode switch 24, power is fed from a power source unit 58 to each block and the drive of the stereoscopic image capture device 1 is started.

A light flux passing through the imaging lens 14 and the diaphragm 16 or the like is formed on the imaging element 17 and a signal charge is accumulated in the imaging element 17. The signal charge accumulated in the imaging element 17 is read out as a voltage signal corresponding to the signal charge on the basis of a read signal added from a timing generator 45. The voltage signal read out from the imaging element 17 is added to an analog signal processing unit 60.

The analog signal processing unit 60 performs correlation double sampling processing (processing to acquire accurate pixel data by finding the difference between the feed-through component level included in the output signal per one pixel of the imaging element and the pixel signal component level, for the purpose of reducing noise (especially, thermal noise) or the like included in the output signal of the imaging element) on the voltage signal output from the imaging element 17, and the R, G and B signals of each pixel are subjected to sampling hold, amplified and then added to an A/D converter 61. The A/D converter 61 converts the sequentially input R, G and B signals into digital R, G and B signals and outputs them to an image input controller 62.

A digital signal processing unit 63 performs predetermined signal processing such as offset processing, gain control processing including white balance correction and sensitivity correction, gamma correction processing and YC processing on the digital image signals input through the image input controller 62. Here, the main image data read out from the main pixel of an odd-numbered line of the imaging element 17 is processed as left-eye image data, and the sub-image data read out from the sub-pixel of an even-numbered line is processed as right-eye image data.

The left-eye image data and the right-eye image data (3D image data) processed in the digital signal processing unit 63 are input in a VRAM 50. The VRAM 50 includes region A and region B that record 3D image data indicating a 3D image of one frame. In the VRAM 50, the 3D image data indicating the 3D image of one frame is alternately rewritten in region A and region B. The written 3D image data is read out from a region different from a region in which the 3D image data is rewritten, out of region A and region B of the VRAM 50.

The 3D image data read out from the VRAM 50 is processed into strip-shaped image fragments in a 3D image signal processing unit 64, encoded in a video encoder 66, output to the 3D image display device 28 for stereoscopic display installed on the back of the camera, and thereby 3D object images are continuously displayed on the display screen of the 3D image display device 28.

When the first-stage press (half press) of the shutter button 22 of operation unit 48 is performed, a CCD 40 starts AF operation and AE operation, moves the focus lens in the light axis direction through a lens drive unit 47 and controls the focus lens to be set to the focusing position.

An AF processing unit 42 denotes a unit to perform contrast AF processing or phase difference AF processing. In the case of performing the contrast AF processing, an AF evaluation value indicating the focusing state is calculated by extracting the high frequency component of a parallax image in a predetermined focus region of at least one of the right and left parallax images and integrating this high frequency component. The AF control is performed by controlling the focus lens in the imaging lens 14 such that this AF evaluation value becomes maximum. Also, in the case of performing the phase difference AF processing, a phase difference between parallax images corresponding to the main pixel and the sub-pixel in a predetermined focus region of the right and left parallax images is detected, and the defocus amount is calculated on the basis of information indicating this phase difference. The AF control is performed by controlling the focus lens in the imaging lens 14 such that this defocus amount becomes 0.

The CPU 40 optionally performs forward/backward operation on the zoom lens in the light axis direction by means of the lens drive unit 47 and changes the focal length.

Moreover, the image data output from the A/D converter 61 at the time of the half press of the shutter button 22 is imported in an AE/AWB detection unit 44.

The AE/AWB detection unit 44 integrates G signals in the entire screen or integrates G signals weighted differently between the center screen part and the peripheral part, and outputs the integration value to the CPU 40. The CPU 40 calculates the brightness (imaging Ev value) of the object from the integration value input from the AE/AWB detection unit 44, decides the F value of the diaphragm 16 and the electronic shutter (shutter speed) of the imaging element 17 according to a predetermined program diagram on the basis of this imaging Ev value, controls the diaphragm 16 by means of the diaphragm drive unit 46 on the basis of the decided diaphragm value and controls the charge accumulation time in the imaging element 17 by means of the timing generator 45 on the basis of the decided shutter speed.

Moreover, although the CPU 40 controls the F value of the diaphragm 16 according to the change in the focal length of the imaging lens 14, the shutter speed or the imaging sensitivity (gain) is controlled according to the control of the F value such that the exposure condition does not vary. Here, details of the control of the F value of this diaphragm 16 are described later.

When the AE operation and the AF operation are finished and the second-stage press (full press) of the shutter button 22 is performed, image data for two images of the left-eye image (main image) and the right-eye image (sub-image) corresponding to the main pixel and the sub-pixel output from the A/D converter 61 in response to the press is input from the image input controller 62 to the VRAM 50 and temporarily recorded.

The image data for two images temporarily recorded in the VRAM 50 is arbitrarily read by the digital signal processing unit 63, and predetermined signal processing including generation processing (YC processing) of luminance data and color difference data of the image data is performed here. The image data subjected to YC processing (YC data) is recorded in the VRAM 50 again. Subsequently, the YC data for two images is output to a compression/decompression processing unit 65, subjected to predetermined compression processing such as JPEG (joint photographic experts group) and thereafter recorded in the VRAM 50 again.

A multipicture file (MP file: a file in a format in which a plurality of images are coupled) is generated from the YC data for two images (compressed data) recorded in the VRAM 50 by the 3D image signal processing unit 64, and the MP file is read out by a media controller 52 and recorded in the recording medium 54.

Here, the AF operation is performed not only in a case where the first-stage press (half press) of the shutter button 22 is performed but also in a case where the right and left parallax images are continuously taken. As the case where the right and left parallax images are continuously taken, for example, there are a case where a live view image (through image) is taken and a case where a moving image is taken.

The stereoscopic image capture device 1 can take not only a stereoscopic image but also a 2D image. Moreover, the stereoscopic image capture device 1 can record and play not only moving images and still images but also sound. A microphone 57 inputs a transmitting voice, a speaker 56 outputs a receiving voice and a voice input/output circuit 55 encodes the voice input from the microphone and decodes the received voice.

[Explanation of Operation of Stereoscopic Image Capture Device]

Next, the operation of the stereoscopic image capture device 1 is described. This imaging processing is controlled by the CPU 40. A program that causes the CPU 40 to execute this imaging processing is recorded in a program storage unit in the CPU 40.

When imaging is started, the CPU 40 drives the imaging lens 14 and the diaphragm 16 to the initial positions. Object light passing through imaging lens 14 is formed on the light receiving surface of the imaging element 17 through the diaphragm 16. Signal charges accumulated in the main pixel and the sub-pixel of the imaging element 17 are sequentially read out at a predetermined frame rate as voltage signals (image signals) corresponding to the signal charges by the timing generator 45, sequentially input in the digital signal processing unit 63 through the analog signal processing unit 60, the A/D converter 61 and the image input controller 62, and right and left parallax images are sequentially generated. The generated right and left parallax images are sequentially input in the VRAM 50 and displayed in real time on the 3D image display device 28.

The photographer can confirm the imaging angle of view by seeing the images (through images) displayed in real time on the 3D image display device 28. Moreover, in response to an operation input of the zoom button of the operation unit 48, the CPU 40 causes the imaging lens 14 to perform zoom operation (adjust the focal length) by means of the lens drive unit 47.

The present invention controls the F value of the diaphragm 16 such that the stereoscopic effect of the right and left parallax images (stereoscopic image) displayed in real time on the 3D image display device 28 at the time of zooming (change in the focal length) of the imaging lens 14 is not changed.

[Control of F Value of Diaphragm 16 that does not Change Stereoscopic Effect]

Next, the principle of control of the F value of the diaphragm 16 that does not change the stereoscopic effect is described.

Figure 6:
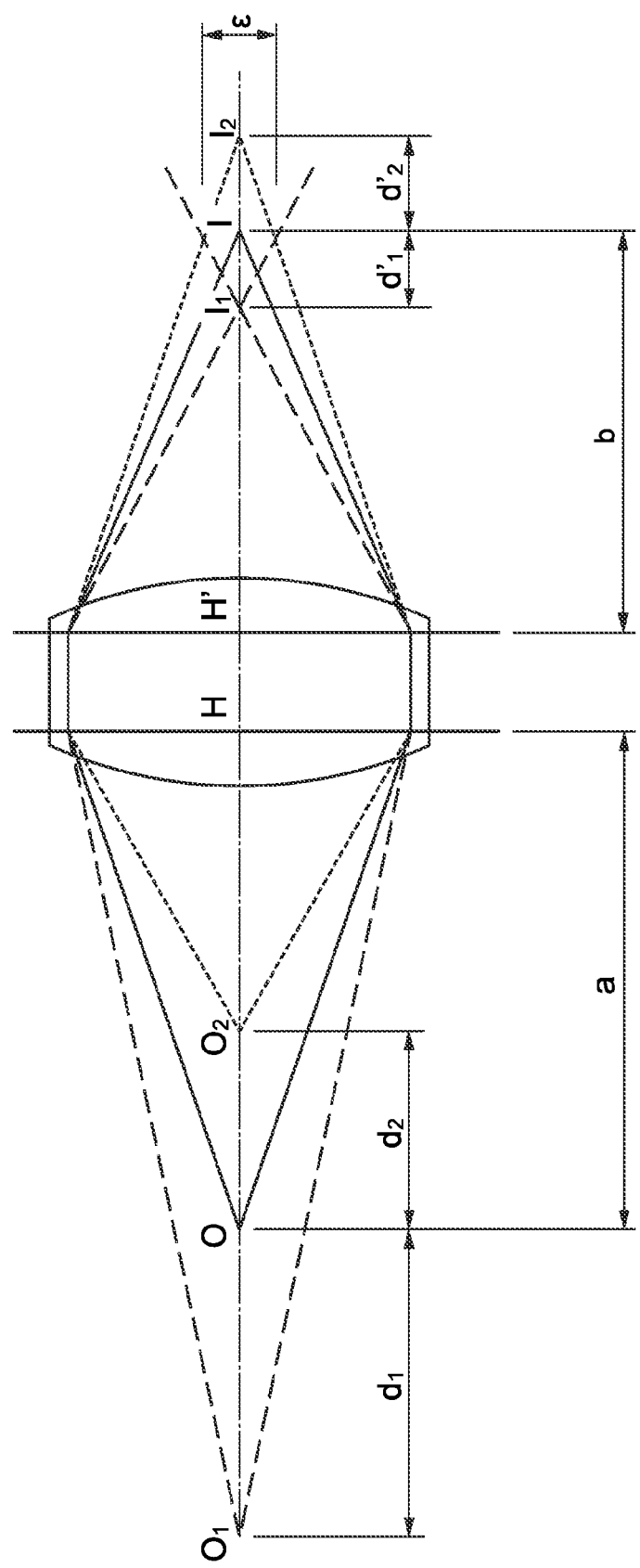
FIG. 6 is a view illustrating a relationship between the object depth and the focus depth.

FIG. 6 is a view illustrating the relationship between the object depth and the focus depth.

FIG. 6 assumes the following.

O: substance surface $O_1$: limiting point of front object depth $O_2$: limiting point of rear object depth I, $I_1$, $I_2$: image positions corresponding to O, $O_1$ and $O_2$ a: distance from front principal-point position H of lens system to O b: distance from rear principal-point position H' of lens system to I $d_1$: rear object depth $d_2$: front object depth $d_1'$, $d_2'$: length of focus depth when assuming defocus c When the F value of the diaphragm is assumed as F and the focal length of the lens is assumed as f, rear object depth $d_1$ and front object depth $d_2$ can be shown by the following equations respectively.

$$d_1 = \frac{a^2 \varepsilon F}{f^2 - a\varepsilon F} \quad \text{[Equation 2]}$$

$$d_2 = \frac{a^2 \varepsilon F}{f^2 + a\varepsilon F}$$

When above-mentioned Equation 2 is transformed, they can be expressed by the following equations.

$$\varepsilon = \frac{d_1 f^2}{F(a^2 + d_1)} \quad \text{[Equation 3]}$$

$$\varepsilon = \frac{d_2 f^2}{F(a^2 - d_1)}$$

Here, when the focal length before the focal length of the imaging lens 14 is changed is f1 and the F value of the diaphragm 16 is FNo1, in a case where the focal length of the imaging lens 14 is changed to f2, if the F value of the diaphragm 16 is assumed to be FNo2 that satisfies a condition that defocus c shown in Equation 3 does not change before and after the change in this focal length, the following equation is established.

$$FNo2 = FNo1 * \left(\frac{f2}{f1}\right)^2 \quad \text{[Equation 1]}$$

By the way, in the stereoscopic image capture device 1, since front-focused or rear-focused defocus parts enter into different positions of the imaging element 17 (the phase shifts), by controlling the F value of the diaphragm 16 such that the defocus becomes constant (that is, by controlling the F value of the diaphragm 16 according to above-mentioned Equation 1), it is possible to prevent the phase shift (stereoscopic effect) of the right and left parallax images from being changed.

First Embodiment of Diaphragm Control

Figure 7:
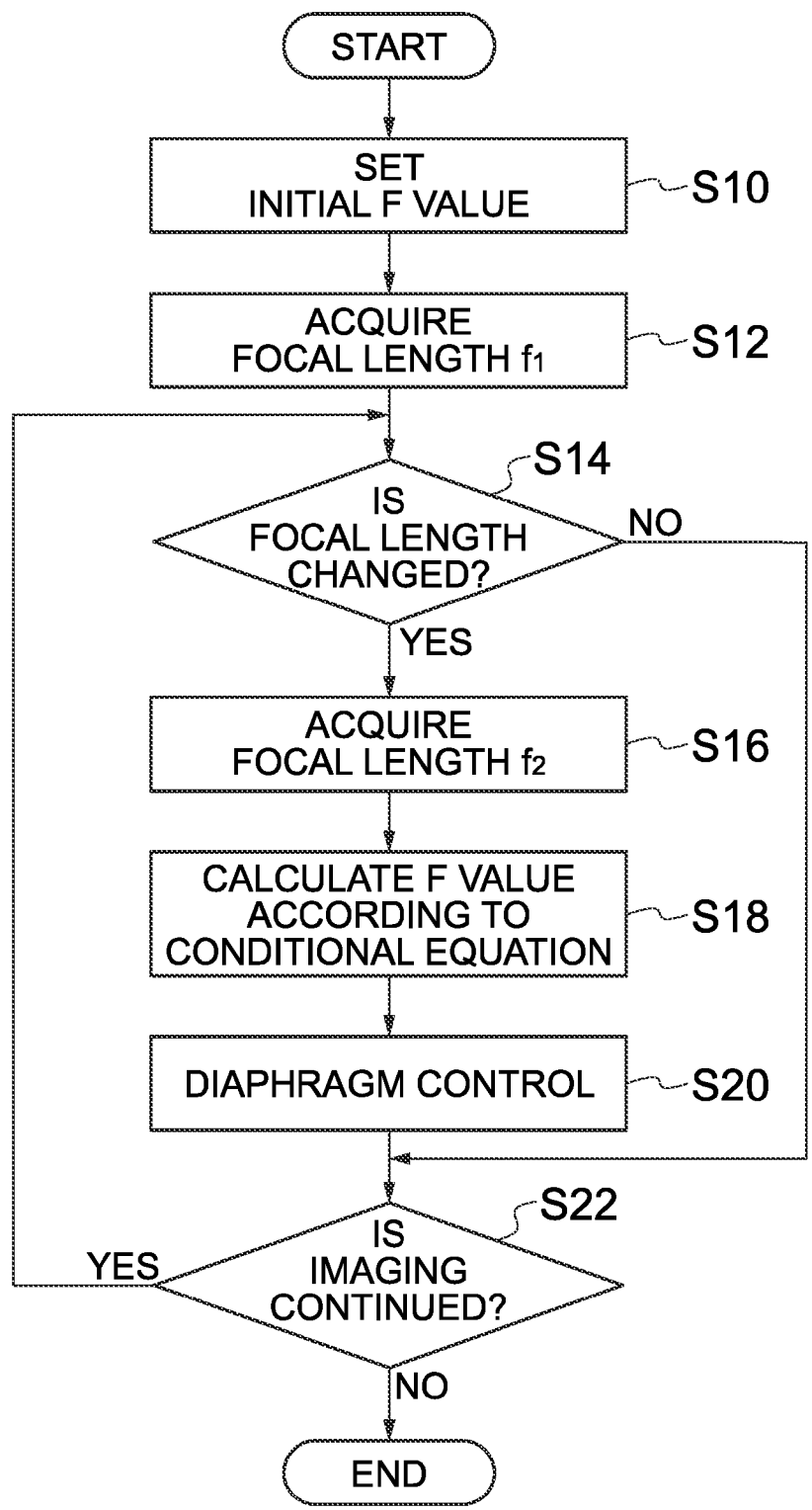
FIG. 7 is a flowchart illustrating the first embodiment of diaphragm control chiefly in a case where right and left parallax images are continuously taken.

FIG. 7 is a flowchart illustrating the first embodiment of diaphragm control mainly in a case where right and left parallax images are continuously taken.

In FIG. 7, first, the initial F value of the diaphragm 16 is set and the F value of the diaphragm 16 is set to the initial F value (step S10). As for the setting of this initial F value, for example, the object brightness (imaging Ev value) is calculated from the integration value input from the AE/AWB detection unit 44, and, based on this imaging Ev value, the F value of the diaphragm 16 and the electronic shutter (shutter speed) of the imaging element 17 are decided according to a predetermined program diagram. Further, the F value of the diaphragm 16 decided when a certain period of time passes after the stereoscopic image capture device 1 is powered on is set as the initial F value.

Moreover, focal length f1 of the imaging lens 14 when the diaphragm 16 is set to an initial F value is acquired (step S12). This focal length f1 can be acquired by detecting the lens position of the imaging lens 14 or acquired from a zoom instruction value output from the CPU 40 to the lens drive unit 47 on the basis of the operation of the zoom button.

Subsequently, the CPU 40 determines whether the focal length of the imaging lens 14 is changed (step S14). In a case where the focal length is changed (in the case of "Yes"), it shifts to step S16, and, in a case where the focal length is not changed (in the case of "No"), it shifts to step S22.

In step S16, focal length f2 after the imaging lens 14 is changed is acquired. Further, based on the initial F value (FNo1) set in step S10, focal length f1 acquired in step S12 and focal length f2 acquired in step S16, the F value (FNo2) of the diaphragm 16 that does not change the stereoscopic effect of the right and left parallax images even if the focal length changes from f1 to f2 is calculated according to the above-mentioned conditional equation of Equation 1 (step S18).

The CPU 40 controls the diaphragm 16 by means of a diaphragm drive unit 46 so as to be the F value (FNo2) calculated in step S18 (step S20).

In step S22, it is determined whether to continue image capture. For example, the image capture is terminated when a 3D still image is taken at the time of taking the 3D still image, or the image capture is terminated when the recording is temporarily stopped or terminated at the time of taking a 3D moving image. Meanwhile, when it is determined that the image capture is continuing (in the case of "Yes"), it returns to step S14 and the processing in above-mentioned steps S14 to S22 is repeated.

As described above, although the stereoscopic effect of the right and left parallax images is decided according to the initial F value of the diaphragm 16 and focal length f1 of the imaging lens 14, afterwards, by controlling the F value of the diaphragm 16 according to the change in the focal length of the imaging lens 14 at the time of adjusting the imaging angle of view (adjusting the focal length) by zooming the imaging lens 14 while seeing the 3D through image displayed in real time on the 3D image display device 28, it is possible to prevent the stereoscopic effect from being changed.

Figure 8:
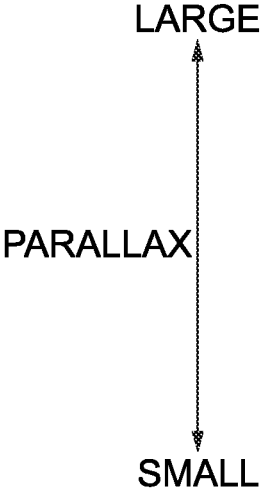
FIG. 8 is a conceptual diagram illustrating the relationships between the focal length of an imaging lens, the F value of a diaphragm and the stereoscopic effect (parallax).

FIG. 8 is a conceptual diagram illustrating the relationships between the focal length of the imaging lens 14, the F value of the diaphragm 16 and the stereoscopic effect (parallax).

In FIG. 8, for example, it is assumed that a predetermined stereoscopic effect (parallax $P_5$) is acquired in a case where the initial F value is F4 and the zoom position is $Z_3$. Afterwards, when the zoom position changes from $Z_3$, $Z_4$ to $Z_5$ in the tele direction, the F value is changed from F4, F8 to F16 such that parallax $P_5$ is not changed. Similarly, when the zoom position changes from $Z_3$, $Z_2$ to $Z_1$ in the wide direction, the F value is changed from F4, F2 to F1 such that parallax P5 is not changed.

By the way, although the stereoscopic effect (parallax) of the right and left parallax images is decided by the initial F value and the zoom position, afterwards, depending on the initial F value and the zoom position, there is a case where, when the zoom position (focal length) is changed, the diaphragm 16 exceeds the possible range (F1 to F16) and it is not possible to set the F value that does not change the stereoscopic effect.

For example, in a case where a predetermined stereoscopic effect (parallax $P_3$) is acquired by initial F value F16 and zoom position $Z_3$, afterwards, when the zoom position is changed from $Z_3$ in the tele direction, it is not possible to select the F value that does not change parallax $P_3$.

As a response in this case, the F value of the diaphragm 16 is fixed to the F value of the limitation. In this case, when the zoom position (focal length) changes over the limitation of the diaphragm 16, the F value is fixed and therefore the parallax is changed.

Moreover, the F value of the diaphragm 16 may be fixed to the F value of the limitation and the change in the zoom position (focal length) in the direction to exceed the limitation of the diaphragm 16 of the imaging lens 14 may be restricted. In this case, although it is possible to cause the stereoscopic effect not to be changed, the zoom range of the imaging lens 14 is restricted.

Further, in a case where the imaging lens 14 is zoom-operated as described above, it is preferable to continuously control the F value of the diaphragm 16 such that the stereoscopic effect is not changed during the zoom operation. In this case, focal length f2 during the change in the focal length of the imaging lens 14 is continuously acquired at predetermined time intervals (for example, 1/30 seconds or 1/60 seconds corresponding to the frame rate), and, based on focal length f1 before the focal length of the imaging lens 14 is adjusted and focal length f2 continuously acquired at the predetermined interval times, the F value of the diaphragm 16 that does not change the stereoscopic effect is continuously calculated from Equation 1. Further, the F value of the diaphragm 16 is continuously controlled so as to become the continuously calculated F values. According to this, it is possible to cause the stereoscopic effect of parallax images not to be changed while a 3D through image is displayed or while the focal length of the imaging lens 14 is changing at the time of recording a moving image.

Second Embodiment of Diaphragm Control

Figure 9:
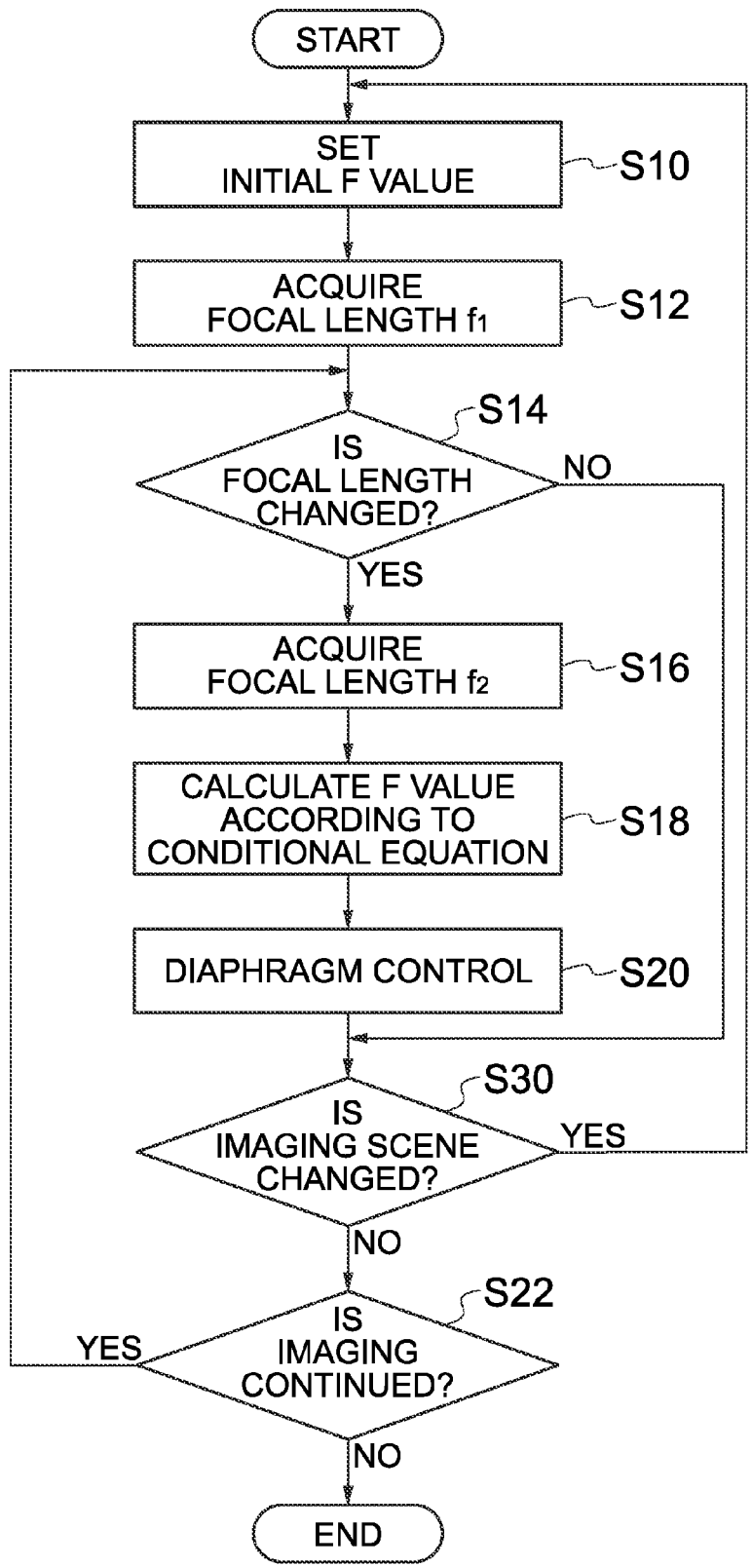
FIG. 9 is a flowchart illustrating the second embodiment of diaphragm control chiefly in a case where right and left parallax images are continuously taken.

FIG. 9 is a flowchart illustrating the second embodiment of diaphragm control mainly in a case where right and left parallax images are continuously taken. Here, the same step numbers are assigned to the common parts with the flowchart illustrated in FIG. 7 and the detailed explanation is omitted.

The second embodiment illustrated in FIG. 9 is different from the first embodiment illustrated in FIG. 7 in that step S30 is added between step S22 and step S24.

In step S30, it is determined whether an imaging scene is changed. For example, the determination of the change in the imaging scene can be performed on the basis of a case where the object luminance changes over a certain value (for example, 1 EV), a case where the object distance changes over a certain distance or a case where the color temperature of the object or the optical source type that illuminates the object changes and the gain value at the time of white balance correction changes, and so on. Moreover, in the case of a camera mounting a GPS device (Global Positioning System) and an orientation sensor, it is possible to determine the change in an imaging scene from the current position or the change in the imaging direction.

Further, in step S30, when it is determined that the imaging scene is changed (in the case of "Yes"), it gets away from the flow line from steps S14 to step S22 and shifts to step S10.

That is, the object changes in a case where the imaging scene changes, and, since it is not considered that zoom operation to adjust the angle of view of the object is continuously performed, control of the F value of the diaphragm 16 to prevent the stereoscopic effect from being changed during the zoom operation is released.

According to this, it is possible to cause the stereoscopic effect during zoom operation not to be changed only in a case where the imaging target does not change.

Other Configuration Examples of Imaging Element

Figure 10:
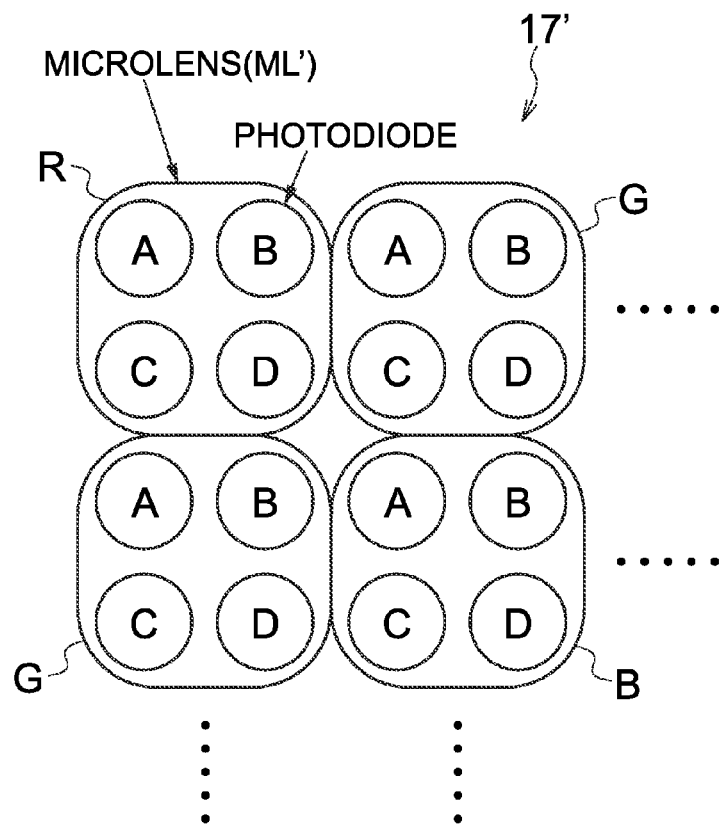
FIG. 10 is a view illustrating another configuration example of an imaging element.

FIG. 10 is a diagram illustrating another configuration example of an imaging element 17'.

In the imaging element 17', four photodiodes A, B, C and D are bidimensionally arranged, one microlens ML' arranged so as to cover the four photodiodes is assumed as one unit (four pixels and one microlens) and this unit is bidimensionally arranged. Each photodiode in the unit can be read out independently.

As illustrated in FIG. 10, among pixels having color filters of R (red), G (green) and B(blue), a pixel arrangement line of GRGR . . . is arranged in the odd-numbered lines (1, 3, 5 . . . ) of the imaging element 17' while a pixel arrangement line of BGBG . . . is arranged in the even-numbered lines (2, 4, 6 . . . ).

Figure 11:
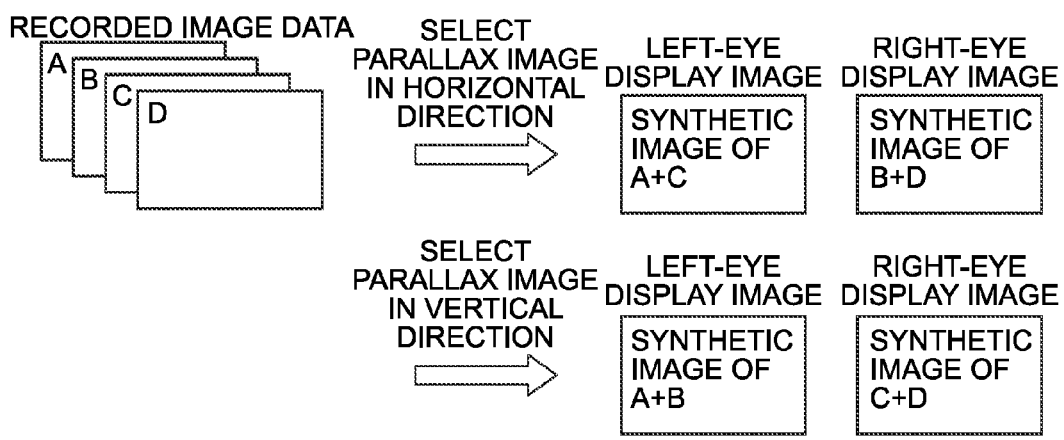
FIG. 11 is a view to describe a mechanism that takes a stereoscopic image by the above-mentioned imaging element.

FIG. 11 is a view illustrating a mechanism to take a stereoscopic image by the imaging element 17'.

In a case where the imaging element 17' is imaged in the horizontal direction (normal horizontal imaging), the synthesis of photodiodes A and C of each unit is the main pixel in which light is received only on the left side of the light axis of a light flux passing through an exit pupil, and the synthetic image of photodiodes A and C is the left parallax image. Moreover, the synthesis of photodiodes B and D of each unit is the sub-pixel in which light is received only on the right side of the light axis of the light flux passing through the exit pupil, and the synthetic image of photodiodes B and D is the right parallax image.

In a case where the imaging element 17' is imaged in the vertical direction (so-called vertical imaging to take an image while rotating the stereoscopic image capture device 1 by 90 degrees), the synthesis of photodiodes A and B of each unit is the main pixel in which light is received only on the left side of the light axis of a light flux passing through an exit pupil, and the synthetic image of photodiodes A and B is the left parallax image. Moreover, the synthesis of photodiodes C and D of each unit is the sub-pixel in which light is received only on the right side of the light axis of the light flux passing through the exit pupil, and the synthetic image of photodiodes C and D is the right parallax image.

Others

In this embodiment, although the F value of the diaphragm 16 decided by AE control when a certain period of time passes after the stereoscopic image capture device 1 is powered on is set as the initial stage F value, it is not limited to this, and the initial F value set as described above may be updated by the F value decided by AE control based on the brightness (imaging Ev value) of the latest object until the focal length of the imaging lens 14 is changed. That is, the F value of the diaphragm 16 calculated on the basis of imaging Ev value when the focal length of the imaging lens 14 is initially changed may be set as the initial F value.

Moreover, in a case where an imaging scene is changed as illustrated in FIG. 9, the initial F value may be set again after the imaging scene is changed.

Further, in a case where a moving image imaging mode to take a 3D moving image is set, the F value of the diaphragm 16 is calculated on the basis of the imaging Ev value when the recording start button is pressed, and this calculated F value can be set to the initial F value.

Further, the user may be possible to specify the level (for example, high, medium, low) of the stereoscopic effect by an operation unit 48 and the initial F value may be set on the basis of the specified level of the stereoscopic effect. In this case, it is preferable to set the initial F value of the diaphragm on the basis of the specified level of the stereoscopic effect and the focal length and object distance of the imaging lens at that time.

Moreover, in this embodiment, although the F value of the diaphragm is controlled so as to become an F value of FNo2 calculated by Equation 1, a case is included where it is controlled so as to become the closest F value to the calculated F value of FNo2 among F values that can be set discretely. According to this, the present invention is applicable even to a diaphragm that cannot continuously control the F value (a diaphragm with the limited stage number of the F value that can be set).

Moreover, an imaging element that can acquire a plurality of parallax images at the same time is not limited to the one in this embodiment, and various ones are applicable.

Further, the present invention is not limited to the above-mentioned embodiments, and it is needless to say that various changes can be made without departing from the spirit of the present invention.

What is claimed is:

1. A stereoscopic image capture device comprising:
    a single imaging optical system that can adjust a focal length;
    an imaging element that forms pupil-divided object images passing through different regions of the imaging optical system, photoelectrically converts the object images passing through the different regions and outputs a plurality of parallax images with different parallaxes;
    a diaphragm that restricts a light flux that enters into the imaging element;
    an operation unit for adjusting the focal length of the imaging optical system; and
    a diaphragm control device for controlling an F value of the diaphragm based on a focal length of the imaging optical system before and after adjusting the focal length of the imaging optical system by the operation unit, wherein, when focal lengths before and after adjusting the focal length of the imaging optical system are assumed to be f1 and f2 and the F value of the diaphragm before adjusting the focal length of the imaging optical system is assumed to be FNo1, the diaphragm control device performs control such that an F value of FNo2 after adjusting the focal length of the imaging optical system becomes an F value that can be set according to a following equation, so that stereoscopic effect of the plurality of parallax images output from the imaging element before and after adjusting the focal length of the imaging optical system is not changed:

$$FNo2 = FNo1 * \left(\frac{f2}{f1}\right)^2.$$ [Equation 1]

2. The stereoscopic image capture device according to claim 1, further comprising a focal length detection device for detecting the focal length of the imaging optical system or a focal length setting device for setting the focal length of the imaging optical system by manual operation, wherein the diaphragm control device acquires the focal length detected by the focal length detection device or the focal length set by the focal length setting device.

3. The stereoscopic image capture device according to claim 1, wherein the diaphragm control device continuously acquires the focal length f2 including a focal length during adjustment of the focal length of the imaging optical system at predetermined time intervals, and continuously controls the F value of the diaphragm based on the focal length f1 before adjusting the focal length of the imaging optical system and the focal length f2 continuously acquired at the predetermined time intervals.

4. The stereoscopic image capture device according to claim 1, further comprising:
a stereoscopic display device; and
a display control device for displaying a stereoscopic image on the stereoscopic display device based on the plurality of parallax images output from the imaging element.

5. The stereoscopic image capture device according to claim 1, further comprising:
a brightness detection device for detecting object brightness; and
an exposure condition decision device for deciding an exposure condition based on the object brightness detected by the brightness detection device,
wherein the exposure condition decision device decides other exposure conditions than the diaphragm based on the F value of the diaphragm controlled by the diaphragm control device.

6. The stereoscopic image capture device according to claim 1, further comprising:
a brightness detection device for detecting object brightness; and
an initial F value setting device for setting an initial F value of the diaphragm based on the object brightness detected by the brightness detection device,
wherein the F value of the diaphragm before adjusting the focal length of the imaging optical system is the F value set by the initial F value setting device.

7. The stereoscopic image capture device according to claim 6, wherein the initial F value setting device sets the initial F value of the diaphragm based on the object brightness detected by the brightness detection device when a certain period of time passes after a power source is turned on.

8. The stereoscopic image capture device according to claim 6, wherein the initial F value setting device sets the initial F value of the diaphragm based on the object brightness detected by the brightness detection device when the focal length of the imaging optical system is initially changed after a power source is turned on.

9. The stereoscopic image capture device according to claim 6, wherein the initial F value setting device sets the initial F value of the diaphragm based on the object brightness detected by the brightness detection device when a recording start in a moving image imaging mode to take a moving image is instructed.

10. The stereoscopic image capture device according to claim 1, further comprising:
a stereoscopic effect designation device for designating a level of a stereoscopic effect of the plurality of parallax images output from the imaging element; and
an initial F value setting device for setting the initial F value of the diaphragm based on the stereoscopic effect designated by the stereoscopic effect designation device,
wherein the F value of the diaphragm before adjusting the focal length of the imaging optical system is the F value set by the initial F value setting device.

11. The stereoscopic image capture device according to claim 10, further comprising:
a ranging device for measuring an object distance; and
a focal length detection device for detecting the focal length of the imaging optical system,
wherein the initial F value setting device sets the initial F value of the diaphragm based on the stereoscopic effect set by the stereoscopic effect designation device, the focal length detected by the focal length detection device and the object distance measured by the ranging device.

12. The stereoscopic image capture device according to claim 1, wherein, when controlling the F value of the diaphragm based on the focal length of the imaging optical system, in a case where a limit F value of the diaphragm is exceeded, the diaphragm control device fixes the limit F value.

13. The stereoscopic image capture device according to claim 1, wherein, when controlling the F value of the diaphragm based on the focal length of the imaging optical system, in a case where a limit F value of the diaphragm is exceeded, the diaphragm control device fixes the limit F value and restricts a change in the focal length of the imaging optical system in a direction to exceed the limit F value of the diaphragm.

14. The stereoscopic image capture device according to claim 1, further comprising:
an imaging scene detection device for detecting a change in an imaging scene; and
a release device for releasing control of the F value of the diaphragm based on the focal length of the imaging optical system by the diaphragm control device when the imaging scene detection device detects that the imaging scene is changed.

15. The stereoscopic image capture device according to claim 1, wherein the imaging element includes a first group pixel and a second group pixel for photoelectric conversion that are arranged in a matrix manner in an exposure region of the imaging element, the first group pixel is restricted in a light receiving direction of a light flux so as to receive light of only an object image passing through a first region of the imaging optical system, the second group pixel is restricted in the light receiving direction of the light flux so as to receive light of only an object passing through a second region of the imaging optical system, and the plurality of parallax images can be read out from the first group pixel and the second group pixel.

16. A stereoscopic image capture method in a stereoscopic image capture device, said method comprising:
adjusting a focal length by a single imaging optical system of said stereoscopic image capture device;
forming pupil-divided object images passing through different regions of the imaging optical system, photoelectrically converting the object images passing through the different regions and outputting a plurality of parallax images with different parallaxes using an imaging element of said stereoscopic image capture device;
restricting a light flux that enters into the imaging element using a diaphragm of said stereoscopic image capture device;
adjusting the focal length of the imaging optical system using an operation unit of said stereoscopic image capture device; and
controlling, using a diaphragm control device of said stereoscopic image capture device, an F value of the diaphragm based on a focal length of the imaging optical system before and after adjusting the focal length of the imaging optical system by the operation unit,
wherein, when focal lengths before and after adjusting the focal length of the imaging optical system are assumed to be f1 and f2 and the F value of the diaphragm before adjusting the focal length of the imaging optical system is assumed to be FNo1, a control is performed by the diaphragm control device such that an F value of FNo2 after adjusting the focal length of the imaging optical system becomes an F value that can be set according to a following equation, so that stereoscopic effect of the plurality of parallax images output from the imaging element before and after adjusting the focal length of the imaging optical system is not changed:

$$FNo2 = FNo1 * \left(\frac{f2}{f1}\right)^2. \qquad \text{[Equation 1]}$$

* * * * *